United States Patent [19]

Tsutsumi et al.

[11] 4,355,542

[45] Oct. 26, 1982

[54] SCAVENGING PUMP

[75] Inventors: Yoshio Tsutsumi, Hirakata; Tomoyuki Takahashi, Yawata, both of Japan

[73] Assignee: Kabushiki Kaisha Komatsu Seisakusho, Tokyo, Japan

[21] Appl. No.: 180,893

[22] Filed: Aug. 25, 1980

[51] Int. Cl.³ ............... F16H 57/04; F01M 9/00
[52] U.S. Cl. ........................... 74/467; 184/6.12
[58] Field of Search ..................... 74/467; 184/6.12

[56] References Cited

U.S. PATENT DOCUMENTS 2,328,519 8/1943 Wahlberg et al. .......... 184/6.12 X
3,065,822 11/1962 McAfee .................. 74/467 UX R
3,097,546 7/1963 Kelbel et al. ............... 74/467 X

*Primary Examiner*—Philip C. Kannan
*Attorney, Agent, or Firm*—Armstrong, Nikaido, Marmelstein & Kubovcik

[57] ABSTRACT

A scavenging gear pump for use in a final drive comprising a drive gear and a driven gear, each being mounted for rotation and in mesh with each other. The drive gear is coupled with an input shaft and rotated thereby and has formed therein a fluid passage for communicating an outlet port of the pump with a fluid chamber formed in the input shaft. A plurality of guide passages are formed in the input shaft for supplying lubricant from the fluid chamber to rotary components, such as bearings and gears.

2 Claims, 3 Drawing Figures

SCAVENGING PUMP

BACKGROUND OF THE INVENTION

This invention relates to a scavenging pump and, in particular, to a scavenging gear pump for use in a final drive.

Scavenging pumps are widely used as low pressure pumps for lubricating bearings and gears.

Conventionally, for lubricating input shaft gears for rotating a drive gear of a gear pump and bearings for supporting the input shaft in a final drive, there has been required to provide pipings for supplying lubricant from an outlet port of the pump to the gears and bearings. Therefore, in addition to pipings, a conventional system requires couplings and O-rings, which results in increase in number of components to be used and also increase in entire system costs.

SUMMARY OF THE INVENTION

It is therefore an object of the present invention to provide a scavenging gear pump for use in a final drive which is capable of lubricating gears and bearings without having any outside piping system connected thereto.

Another object of the present invention is to provide a scavenging gear pump which is simple in construction and requires small spaces to install.

In accordance with an aspect of the present invention, there is provided a scavenging gear pump for use in a final drive including a casing for the final drive, the casing having formed therein a fluid reservoir for lubricant, and an input shaft rotatably supported through bearing means in said casing, said input shaft having formed therein a first fluid chamber leading to said bearing means, said scavenging gear pump comprising; a housing detachably mounted on said casing, said housing having formed therein an inlet port and an outlet port of said pump and a second fluid chamber communicating with said outlet port, said inlet port being communicated with said fluid reservoir; a drive gear rotatably mounted in said housing, said drive gear being coupled with said input shaft and having formed therein a fluid passage interconnecting said first and second fluid chambers; and a drive gear rotatably mounted in said housing, said driven gear being in mesh with said drive gear.

The above and other objects, features and advantages of the present invention will be readily apparent from the following description taken in conjunction with the accompanying drawings.

DESCRIPTION OF THE PREFERRED EMBODIMENT

Figure 1:
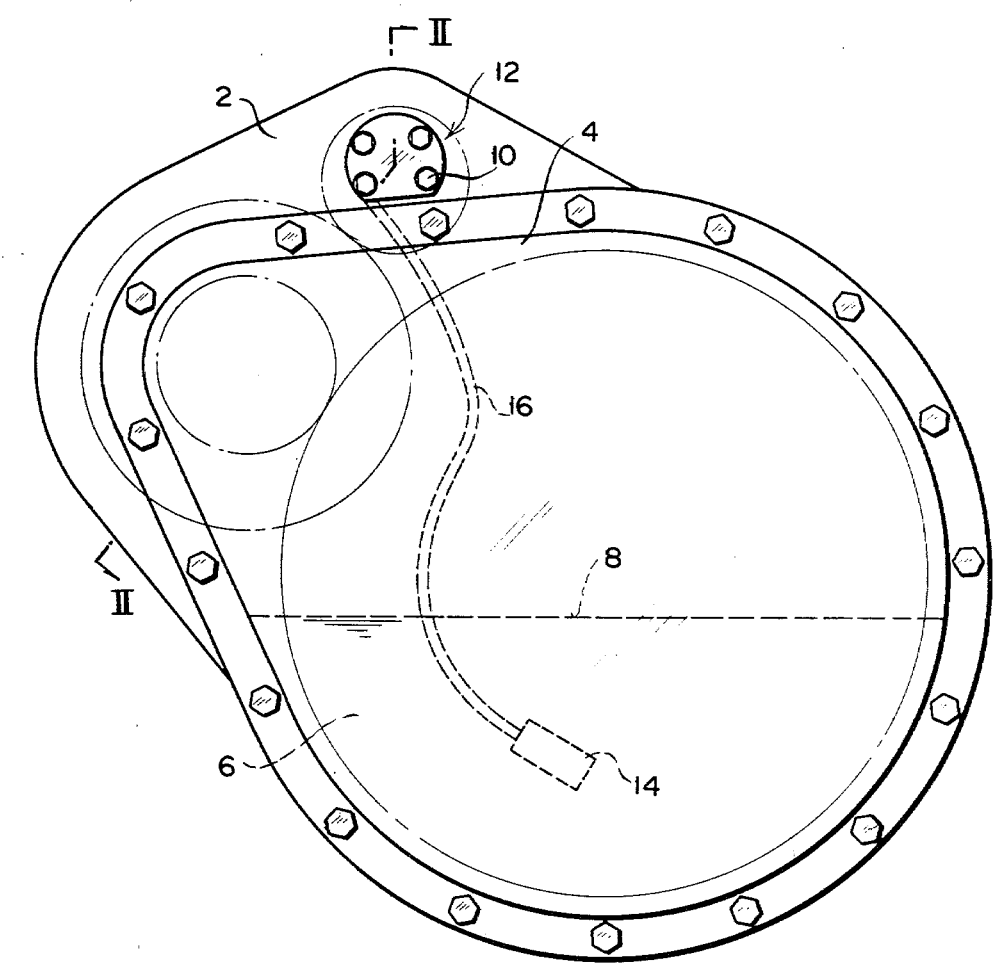
FIG. 1 is a side elevational view of a final drive casing employing a scavenging gear pump according to the present invention.

The present invention will now be described below with reference to the accompanying drawings. Referring to FIG. 1, reference numeral 2 denotes a final drive casing to which a cover 4 is bolted. Formed in the lower section of the casing 2 is a fluid reservoir 6 containing lubricant therein. The level of the lubricant is shown by a broken line 8. Various gears are shown by phantom lines in the drawing.

Detachably mounted to the casing 2 by means of bolts 10 is a scavenging gear pump 12 of the present invention. By rotating the scavenging pump 12, lubricating fluid from the reservoir 6 is introduced into the pump 2 through a filter 14 and a suction pipe 16.

Figure 2:
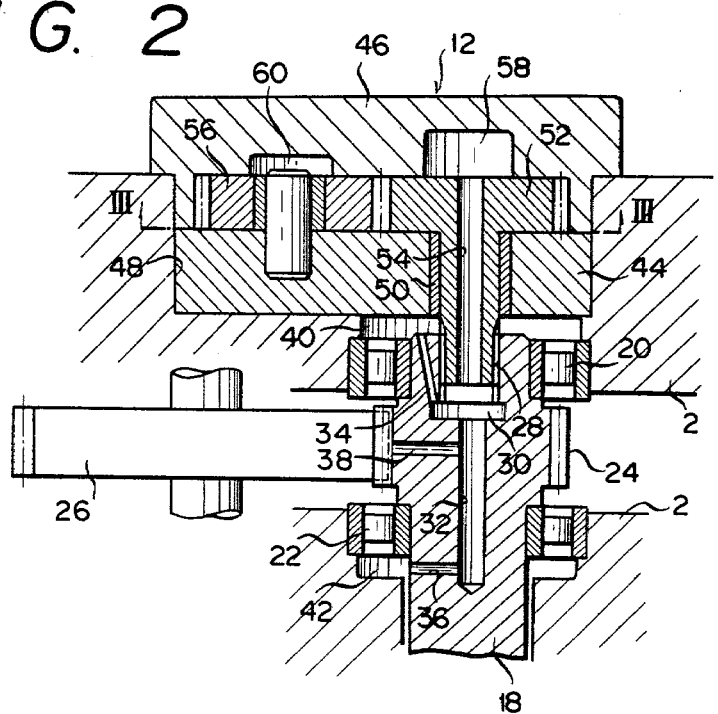
FIG. 2 is a cross-sectional view taken along the line II—II of FIG. 1.

Referring now to FIG. 2, an input shaft 18 is rotatably supported by the casing 2 through bearings 20, 22.

Formed on the input shaft 18 is a gear 24 which, in turn, is in mesh with another gear 26 which is supported for rotation by the casing 2 (the detail of which is not shown in the drawing). The input shaft 18 has formed therein at one end portion thereof a splined hole 28 and a fluid chamber 30 adjacent thereto.

Also formed in the input shaft 18 are a passage 32 communicating with the fluid chamber 30 and guide passages 34, 36 and 38. The guide passages 34 and 36 are open to spacings 40 and 42 accommodating the bearings 20 and 22, respectively while the guide passage 38 is open to gear bottom between two teeth of the gear 24.

The scavenging gear pump 12 of the present invention has a lower housing 44 and an upper housing 46 for the convenience of assembling and disassembling. The lower housing 44 is mounted in a hole 48 formed in the casing 2.

Rotatably mounted in the lower housing 44 through a bushing 50 is a drive gear 52 adapted to be splined to the splined hole 28 of the input shaft 18. The drive gear 52 has formed therein an axial fluid passage 54 communicating with the fluid chamber 30.

Figure 3:
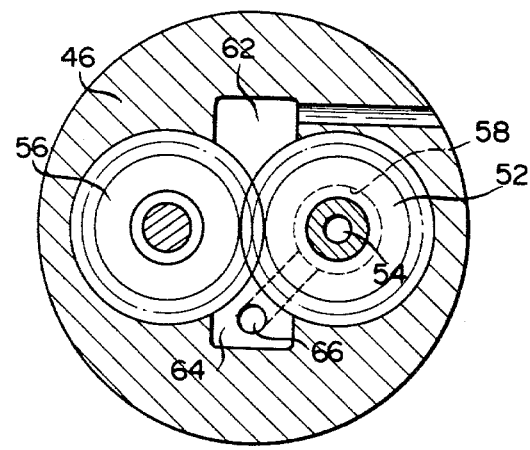
FIG. 3 is a cross-sectional view taken along the line III—III of FIG. 2.

Also rotatably mounted in the lower housing 44 and in engagement with the drive gear 52 is a driven gear 56. The upper housing 46 has formed therein a large fluid chamber 58 and a small fluid chamber 60 facing head ends of the drive gear 52 and the driven gear 56, respectively. Although not seen in FIG. 2 but shown in FIG. 3, the upper housing 46 has also formed therein an inlet port 62 and an outlet port 64. The inlet port 62 is communicated with the fluid reservoir 6 through the suction pipe 16 and the outlet port 64 is communicated with the fluid chamber 58 through a passage 66 formed in the upper housing 46.

The operation of the gear pump will be described below.

Upon rotation of the input shaft 18, the drive gear 52 together with the driven gear 56 of the pump are rotated. Therefore, the pair of gears 52 and 56 functions as a gear pump to pump up lubricating fluid from the reservoir 6 through the suction pipe 16 and the inlet port 62 and then discharge it from the outlet port 64.

Since the outlet port 64 is communicated with the fluid chamber 58 through the passage 66, the discharged fluid is intruduced into the fluid chamber 58 and is then supplied to the fluid chamber 30 formed in the input shaft 18 through the axial passage 54.

Lubricating fluid in the chamber 30 is then supplied to the bearings 20, 22 and the gears 24, 26 through the guide passages 34, 36 and 38, respectively. Therefore, according to the present invention, without providing any outside piping system, the lubricating fluid can be effectively supplied to the bearings and gears.

It should be understood that the present invention is not to be limited to the particular construction that is shown and described, since it will be apparent to those skilled in the art that variations may be made without departing from the spirit and the scope of the invention defined in the appended claims.

What we claim is:

1. A scavenging gear pump for use in a final drive including a casing for the final drive, the casing having formed therein a fluid reservoir for lubricant, and an input shaft rotatably supported through bearing means in said casing, said input shaft having formed therein a first fluid chamber leading to said bearing means, said scavenging gear pump comprising:

a housing detachably mounted on said casing, said housing having formed therein an inlet port and an outlet port of said pump and a second fluid chamber communicating with said outlet port, said inlet port being communicated with said fluid reservoir;

a drive gear rotatably mounted in said housing, said drive gear being coupled with said input shaft and having formed therein a fluid passage interconnecting said first and second fluid chambers; and a driven gear rotatably mounted in said housing, said driven gear being in mesh with said drive gear.

2. A scavenging gear pump as recited in claim 1 wherein said input shaft has a gear fixedly secured thereto and wherein a guide passage is formed in said input shaft for supplying lubricant from said first fluid chamber to said gear.

* * * * *